United States Patent
Jastrzebski et al.

(10) Patent No.: US 11,286,983 B2
(45) Date of Patent: Mar. 29, 2022

(54) CONTROL DEVICE AND A METHOD FOR CONTROLLING MAGNETIC LEVITATION AND TORQUE GENERATION

(71) Applicant: LAPPEENRANNAN TEKNILLINEN YLIOPISTO, Lappeenranta (FI)

(72) Inventors: Rafal Jastrzebski, Lappeenranta (FI); Pekko Jaatinen, Lappeenranta (FI)

(73) Assignee: LAPPEENRANNAN TEKNILLINEN YLIOPISTO, Lappeenranta (FI)

(*) Notice: Subject to any disclaimer, the term of this patent is extended or adjusted under 35 U.S.C. 154(b) by 717 days.

(21) Appl. No.: 15/737,542

(22) PCT Filed: May 11, 2016

(86) PCT No.: PCT/FI2016/050311
§ 371 (c)(1),
(2) Date: Dec. 18, 2017

(87) PCT Pub. No.: WO2016/207481
PCT Pub. Date: Dec. 29, 2016

(65) Prior Publication Data
US 2018/0180095 A1    Jun. 28, 2018

(30) Foreign Application Priority Data
Jun. 26, 2015    (FI) .................................... 20155503

(51) Int. Cl.
*H02P 8/38*    (2006.01)
*H02P 7/29*    (2016.01)
(Continued)

(52) U.S. Cl.
CPC ...... *F16C 32/0476* (2013.01); *F16C 32/0451* (2013.01); *F16C 32/0457* (2013.01);
(Continued)

(58) Field of Classification Search
CPC ........... H02P 23/08; H02P 21/50; H02P 25/06
See application file for complete search history.

(56) References Cited

U.S. PATENT DOCUMENTS

| | | |
|---|---|---|
| 2005/0077793 A1 | 4/2005 | Garvey et al. |
| 2014/0239876 A1* | 8/2014 | Hao ...................... H02P 25/188 318/724 |

FOREIGN PATENT DOCUMENTS

| | | |
|---|---|---|
| EP | 2 589 827 A1 | 5/2013 |
| JP | H04-11187613 | 7/1999 |

(Continued)

OTHER PUBLICATIONS

Chiba et al., "A Novel Middle-Point-Current-Injection-Type Bearingless PM Synchronous Motor for Vibration Suppression", IEEE Transactions on Industry Applications, 2011, pp. 1700-1706, vol. 47, No. 4.

(Continued)

*Primary Examiner* — Kawing Chan
*Assistant Examiner* — Charles S Laughlin
(74) *Attorney, Agent, or Firm* — Nixon & Vanderhye (57) ABSTRACT

An electrical drive includes an electrical machine, a first converter stage connected to terminals of stator phase-windings of the electrical machine, and a second converter stage connected to intermediate points of the stator phase-windings. A control device determines first component currents and second component currents so that torque is generated in accordance with electrical machine control and magnetic levitation force is directed to a rotor of the electrical machine in accordance with levitation control when portions of the phase-windings between the terminals and the intermediate points carry both the first and second component currents and the other portions of the phase-windings carry the first component currents. The reference currents for the first converter stage are determined based on (Continued)

the first and second component currents, and the reference currents for the second converter stage are determined based on the second component currents.

18 Claims, 3 Drawing Sheets

(51) Int. Cl.
*F16C 32/04* (2006.01)
*H02P 4/00* (2006.01)
*H02P 27/08* (2006.01)
*H02K 11/215* (2016.01)
*H02P 25/16* (2006.01)
*H02P 29/40* (2016.01)
*H02K 11/21* (2016.01)
*G05B 17/02* (2006.01)
*H02K 7/09* (2006.01)

(52) U.S. Cl.
CPC .......... *F16C 32/0497* (2013.01); *G05B 17/02* (2013.01); *H02K 7/09* (2013.01); *H02K 11/21* (2016.01); *H02K 11/215* (2016.01); *H02P 4/00* (2013.01); *H02P 25/16* (2013.01); *H02P 27/08* (2013.01); *H02P 29/40* (2016.02); *H02K 2213/03* (2013.01)

(56) References Cited

FOREIGN PATENT DOCUMENTS

| JP | H11-187613 | 7/1999 | | |
|----|---|---|---|---|
| JP | 2013-126273 | 6/2013 | | |
| JP | 2013126273 A | * | 6/2013 | .......... F16C 32/0497 |

OTHER PUBLICATIONS

Severson et al., "Practical Implementation of Dual Purpose No Voltage Drives for Bearingless Motors", Proceedings of Applied Power Electronics Conference and Exposition (APEC), 2015, pp. 819-826.
Kobayashi et al., "A Radial Position Control Method of Bearingless Motor Based on d-q-Axis Current Control", IEEE Transactions on Industry Applications, 2013, pp. 1827-1835, vol. 49, No. 4.
Huang et al., "Analysis and Control of Multiphase Permanent-Magnet Bearingless Motor With a Single Set of Half-Coiled Winding", IEEE Transactions on Industry Applications, 2014, pp. 3137-3145, vol. 61, No. 7.
International Search Report, dated Sep. 15, 2016, from corresponding PCT application No. PCT/FI2016/050311.
FI Search Report, dated Jan. 26, 2016, from corresponding FI application No. 20155503.
Okada et al., "Levitation and Torque Control of Internal Permanent Magnet Type Bearingless Motor," IEEE Transactions on Control Systems Technology, vol. 4, No. 5, Sep. 1, 1996, pp. 565-571.
Supplementary European Search Report for Application No. 16 81 3789, dated Nov. 12, 2018.
Search Report in the corresponding Chinese patent application No. 201680045938.2 dated Apr. 26, 2019.

* cited by examiner

CONTROL DEVICE AND A METHOD FOR CONTROLLING MAGNETIC LEVITATION AND TORQUE GENERATION

FIELD OF TECHNOLOGY

The disclosure relates generally to control of magnetic levitation and torque generation in an electrical drive. More particularly, the disclosure relates to a control device and to a method for controlling an electrical drive. Furthermore, the disclosure relates to a computer program for controlling an electrical drive.

BACKGROUND

Magnetic levitation systems, such as e.g. active magnetic bearings "AMB", are commonly known in the art. Magnetic levitation systems are commonly utilized for supporting a rotating or oscillating object. Using magnetic levitation in rotating machinery results in for example: reduction of friction, oil-free operation, lower maintenance costs, and/or higher reliability when compared to traditional rotating machines with mechanical bearings. Combining functionalities for torque generation and magnetic levitation into one electrical machine results in a shorter rotor and more affordable control and driving electronics than a traditional AMB rotor system which comprises separate AMB actuators in addition to an electrical machine for generating torque. Electrical machines providing combined torque generation and magnetic levitation functionalities are typically called bearingless electrical machines although electrical machines of the kind mentioned above are typically provided with mechanical safety bearings for supporting the rotor in a case of a failure in the magnetic levitation.

Publication Chiba, A., et al., A Novel Middle-Point-Current-Injection-Type Bearingless PM Synchronous Motor for Vibration Suppression, Institute of Electrical and Electronics Engineers "IEEE" Transactions on Industry Applications, Vol. 47, No. 4, 2011 describes a stator winding structure for a middle-point-current-injection-type bearingless permanent magnet synchronous motor. The motor does not have additional windings for radial magnetic force generation but each stator phase-winding has a connection to an intermediate point of the stator phase-winding so that force producing current can be supplied to the stator phase-winding under consideration. A first converter stage is connected to terminals of the stator phase-windings and a second converter stage connected to the intermediate points of the stator phase-windings. The first converter stage is configured to supply torque generating currents to the terminals of the stator phase-windings and the second converter stage is configured to supply force generating currents to the intermediate points of the stator phase-windings. When current is supplied to the intermediate point of a stator phase-winding, there is unbalance between currents flowing in different portions of the stator phase-winding on different sides of the intermediate point and thus radial magnetic force is directed to the rotor. The bearingless permanent magnet synchronous motor described by Chiba et al. requires only one additional three-phase converter and thus the system can be cost effective. There is, however, still a need for development of control techniques for controlling bearingless motors of the kind mentioned above. For example, it may be challenging to arrange the co-operation of the above-mentioned first and second converter stages in a robust and cost-effective way. For example, in the bearingless permanent magnet synchronous motor described by Chiba et al., only the above-mentioned intermediate points of the stator phase-windings are utilized for supplying currents for the radial magnetic force production. This results in different current requirements for the different parts of the stator phase-windings and in limitations in the force production and in how fast the flux and thereby the force can be changed.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new control device for controlling an electrical drive that comprises:
   an electrical machine comprising a stator and a rotor,
   a first converter stage connected to terminals of phase-windings of the stator, and
   a second converter stage connected to intermediate points of the phase-windings of the stator, each of the phase-windings comprising a first portion between the terminal and the intermediate point of the phase-winding under consideration, and each of the phase-windings comprising a second portion in addition to the first portion of the phase-winding under consideration.

A control device according to the invention comprises a computing system configured to:
   determine first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents,
   determine reference currents for the first converter stage on the basis of the first and second component currents, and
   determine reference currents for the second converter stage on the basis of at least the second component currents.

The operations of the above-mentioned first and second converter stages are interconnected via the reference currents of the first converter stage and the reference currents of the second converter stage, and thus there is no need for complex control systems for arranging the co-operation of the above-mentioned first and second converter stages. The above-mentioned electrical machine control may comprise for example a rotational speed sensor or estimator, a rotational position sensor or estimator, voltage sensors or estimators and/or current sensors or estimators, and a speed controller that provides a torque reference. The above-mentioned levitation control may comprise for example a position sensor or estimator for measuring or estimating the position of the rotor in mutually perpendicular radial directions and a controller for producing mutually perpendicular force references for driving the rotor to its reference position. The position estimator for estimating the position of the rotor in the mutually perpendicular radial directions can be based on for example a rotational position sensor or estimator and on current, voltage and/or flux sensors. Each current and/or flux sensor can be located in the main electrical and/or magnetic circuits or elsewhere than in the main electrical and/or magnetic circuits. The current and/or flux sensors located elsewhere than in the main electrical and/or magnetic circuits may comprise for example search coils and/or stray flux sensors. Furthermore, measured temperature can be used in the estimation of the position. The computing system can be configured to determine the above-mentioned first and second component currents on the basis of a computational model of the electrical machine and the above-mentioned torque and force references.

In accordance with the invention, there is provided also a new method for controlling an electrical drive of the kind described above. A method according to the invention comprises:

determining first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents, determining reference currents for the first converter stage on the basis of the first and second component currents, and determining reference currents for the second converter stage on the basis of at least the second component currents.

In accordance with the invention, there is provided also a new electrical drive that comprises:

an electrical machine comprising a stator and a rotor, a first converter stage connected to terminals of phase-windings of the stator, a second converter stage connected to intermediate points of the phase-windings of the stator, and a control device according to the invention for determining reference currents for the first converter stage and for determining reference currents for the second converter stage.

In accordance with the invention, there is provided also a new computer program controlling an electrical drive of the kind described above. A computer program according to the invention comprises computer executable instructions for controlling a programmable processing system of the electrical drive to:

determine first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents, determine reference currents for the first converter stage on the basis of the first and second component currents, and determine reference currents for the second converter stage on the basis of at least the second component currents.

In accordance with the invention, there is provided also a new computer program product. The computer program product comprises a non-volatile computer readable medium, e.g. an optical disc, encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Furthermore, it is to be understood that lists and groups of examples provided in the description given below are not exhaustive unless otherwise explicitly stated.

Figure 1A:
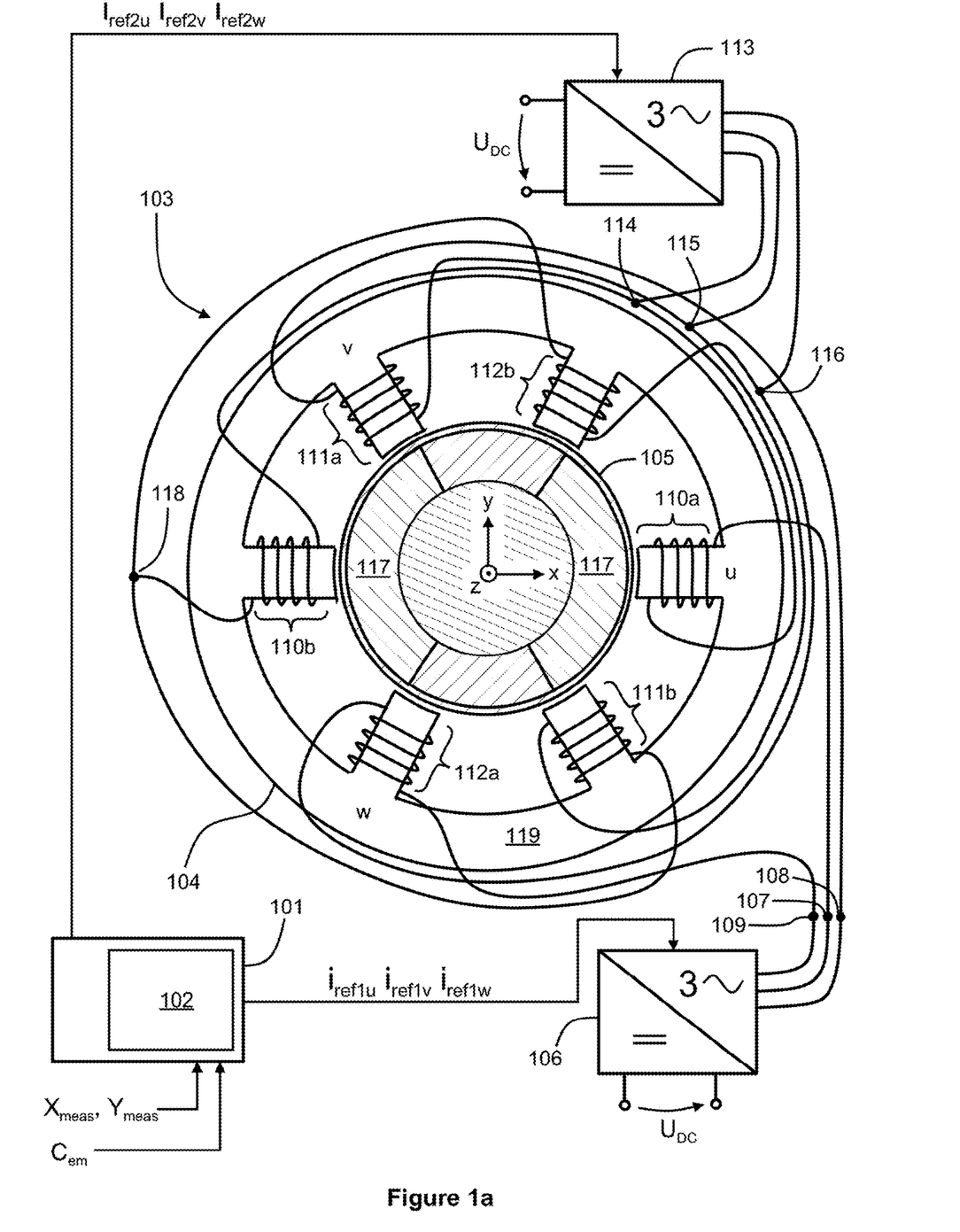
FIGS. 1a and 1b illustrate an electrical drive comprising a control device according to an exemplifying and non-limiting embodiment of the invention.
Figure 1B:
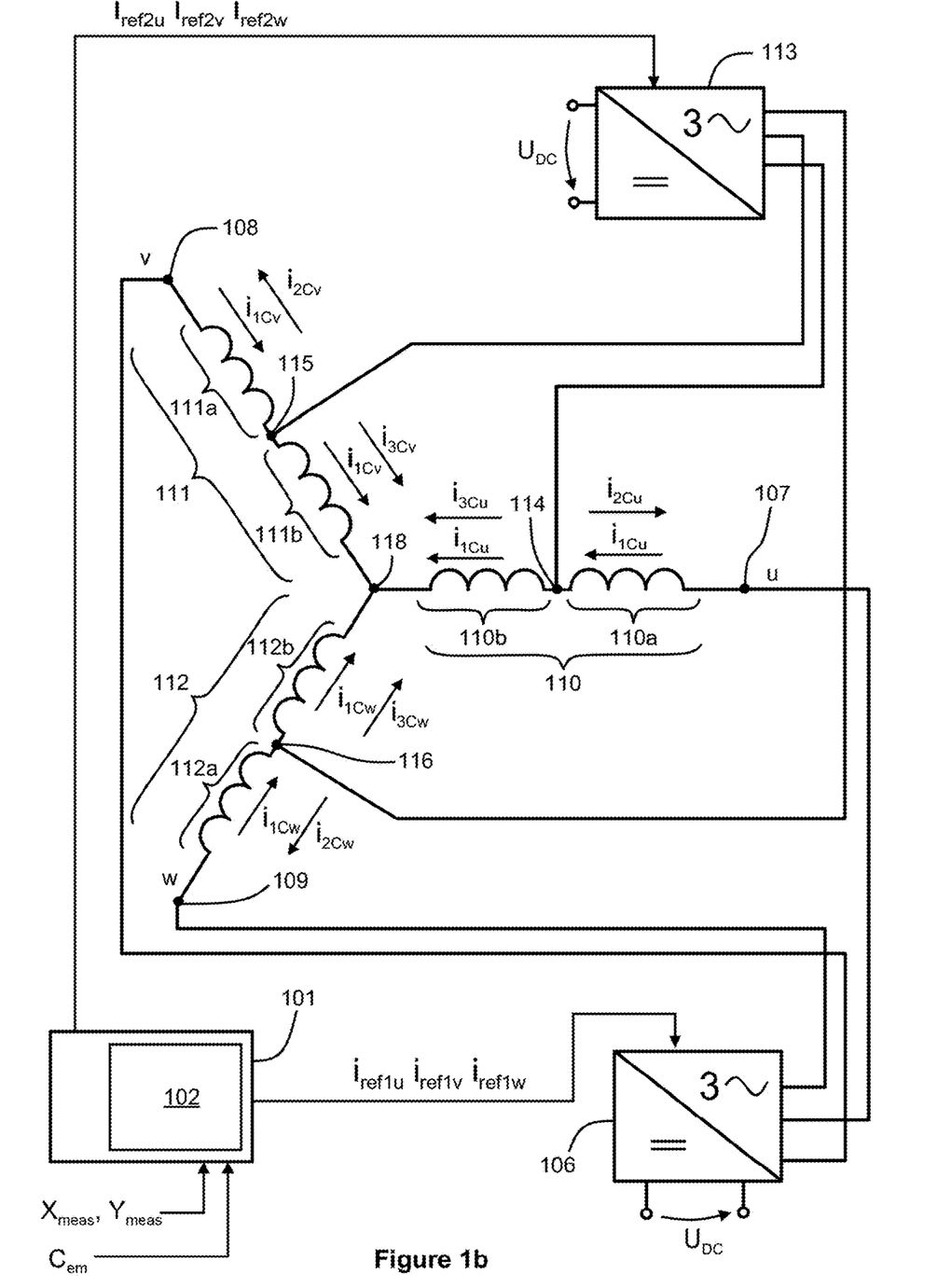

FIG. 1a shows a schematic illustration of an electrical drive comprising a control device 101 according to an exemplifying and non-limiting embodiment of the invention. The electrical drive comprises an electrical machine 103 that comprises a stator 104 and a rotor 105. The electrical machine 103 may operate as a motor or as a generator. In this exemplifying case, the electrical machine 103 is a permanent magnet machine whose rotor 105 comprises permanent magnet material 117. The stator of the electrical machine 103 comprises a ferromagnetic core structure 119 and a stator winding. It is worth noting that FIG. 1a shows a schematic illustration and thus the shapes and the mutual dimensions of the teeth, slots, and the yoke-section of the ferromagnetic core structure 119 are not necessarily optimal from the viewpoint of the operation of the electrical machine 103. In this exemplifying case, the stator winding is a three-phase winding where the number of pole-pairs is one, i.e. p=1. FIG. 1b shows a circuit diagram of the stator winding. The stator winding comprises three phase-windings 110, 111, and 112 connected to a star-point 118. Each phase-winding comprises a first portion between a terminal of the phase-winding and an intermediate point of the phase-winding. Furthermore, each phase-winding comprises a second portion in addition to the first portion. The second portion of each phase-winding is between the star-point 118 and the intermediate point of the phase-winding under consideration. As shown in FIG. 1b, the phase-winding 110 comprises the first portion 110a and the second portion 110b, the phase-winding 111 comprises the first portion 111a and the second portion 111b, and the phase-winding 112 comprises the first portion 112a and the second portion 112b. In FIGS. 1a and 1b, the terminals of the phase-windings are denoted with reference numbers 107, 108, and 109, and the intermediate points of the phase-windings are denoted with reference numbers 114, 115, and 116.

The electrical drive comprises a first converter stage 106 connected to the terminals 107-109 of the phase-windings 110-112. The electrical drive comprises a second converter stage 113 connected to the intermediate points 114-116 of the phase-windings 110-112. The first converter stage 106 can be e.g. an inverter stage which convers direct voltage $U_{DC}$ into controllable three-phase alternating voltages. In principle, the first converter stage 106 could be as well a direct converter which converts e.g. three-phase input alternating voltages into controllable three-phase output alternating voltages. Correspondingly, the second converter stage 113 can be e.g. an inverter stage which convers direct voltage $U_{DC}$ into controllable three-phase alternating voltages. In principle, the second converter stage 106 could be as well a direct converter which converts e.g. three-phase input alternating voltages into controllable three-phase output alternating voltages.

The electrical drive comprises a control device 101 for determining reference currents $i_{ref1u}$, $i_{ref1v}$, and $i_{ref1w}$ for the first converter stage 106 and for determining reference currents $i_{ref2u}$, $i_{ref2v}$, and $i_{ref2w}$ for the second converter stage 113. The first converter stage 106 can be configured to apply for example two-point hysteresis control for controlling the output currents of the first converter stage 106 to be the reference currents $i_{ref1u}$, $i_{ref1v}$, and $i_{ref1w}$ with a sufficient accuracy. Correspondingly, second converter stage 113 can be configured to apply the two-point hysteresis control for controlling the output currents of the second converter stage 113 to be the reference currents $i_{ref2u}$, $i_{ref2v}$, and $i_{ref2w}$ with a sufficient accuracy. The control device 101 comprises a computing system 102 configured to determine first component currents $i_{1Cu}$, $i_{1Cv}$ and $i_{1Cw}$ and second component currents $i_{2Cu}$, $i_{2Cv}$ and $i_{2Cw}$ so that torque is generated in accordance with electrical machine control and magnetic levitation force is directed to the rotor 105 in accordance with levitation control when the first portions 110a, 111a, and 112a of the phase-windings carry both the first and second component currents and the second portions 110b, 111b, and 112b of the phase-windings carry at least the first component currents. When current is supplied to the intermediate point of a phase-winding, there is unbalance between currents flowing in the first and second portions of the phase-winding and thus radial magnetic force is directed to the rotor 105. The computing system 102 is configured to determine the reference currents $i_{ref1u}$, $i_{ref1v}$, and $i_{ref1w}$ for the first converter stage 106 on the basis of the first and second component currents so that $i_{ref1u}=i_{1Cu}-i_{2Cu}$, $i_{ref1v}=i_{1Cv}-i_{2Cv}$, and $i_{ref1w}=i_{1Cw}-i_{2Cw}$. The computing system 102 is configured to determine the reference currents $i_{ref2u}$, $i_{ref2v}$, and $i_{ref2w}$ for the second converter stage 113 on the basis of at least the second component currents e.g. so that $i_{ref2u}=i_{2Cu}$, $i_{ref2v}=i_{2Cv}$, and $i_{ref2w}=i_{2Cw}$.

The above-mentioned electrical machine control may comprise for example a rotational speed and/or rotational position sensor and a speed controller that provides a torque reference. The rotational speed and/or rotational position sensor is not shown in FIGS. 1a and 1b. In FIGS. 1a and 1b, a quantity $C_{em}$ represents a control quantity related to the electrical machine control. The quantity $C_{em}$ can be e.g. a measured or estimated rotational speed and/or rotational position on the basis of which the computing system 102 forms the torque reference. The rotational speed and/or the rotational position can be estimated on the basis of magnetic fluxes, voltages, and/or currents. Furthermore, measured temperature can be used in the estimation. It is also possible that the electrical machine 103 is driven with an externally given torque reference in which case the quantity $C_{em}$ can be the torque reference. The above-mentioned levitation control may comprise for example a position sensor or estimator for measuring or estimating the position of the rotor 105 in mutually perpendicular radial directions and a controller for producing mutually perpendicular force references for driving the rotor to its reference position. The position sensor or estimator is not shown in FIGS. 1a and 1b. The position of the rotor 105 in the mutually perpendicular radial directions can be estimated on the basis of magnetic fluxes, the rotational position, voltages, and/or currents. Furthermore, the measured temperature can be used in the estimation. The mutually perpendicular radial directions can be for example the x- and y-directions of a coordinate system shown in FIG. 1a. In FIGS. 1a and 1b, quantities $X_{meas}$ and $Y_{meas}$ relate to the levitation control and represent the measured position of the rotor 105 in the x- and y-directions. The computing system 102 is configured to produce mutually perpendicular force references on the basis of the quantities $X_{meas}$ and $Y_{meas}$ and the reference position of the rotor.

The computing system 102 can be configured to determine the first component currents $i_{1Cu}$, $i_{1Cv}$, and $i_{1Cw}$ and the second component currents $i_{2Cu}$, $i_{2Cv}$, and $i_{2Cw}$ on the basis of a computational model of the electrical machine 103 and on the basis of the above-mentioned torque reference and the mutually perpendicular force references. The relation between the first and second component currents and the torque reference can be approximated with the following equation:

$$T_{ref}=T_{C1}(\Psi_{PM}\cos(\theta)(i_{1Cu}-(i_{1Cv}+i_{1Cw})/2)-\Psi_{PM}\sin(\theta) \\ \sqrt{3}(i_{1Cv}-i_{1Cw})/2)-T_{C2}(\Psi_{PM}\cos(\theta)(i_{2Cu}-(i_{2Cv}+ \\ i_{2Cw})/2)-\Psi_{PM}\sin(\theta)\sqrt{3}(i_{2Cv}-i_{2Cw})/2), \qquad (1)$$

where $T_{ref}$ is the torque reference, $\Psi_{PM}$ is the amplitude of the fundamental components of the magnetic flux linkages produced by the permanent magnets of the rotor to the phase-windings 110-112, $\theta$ is the rotational angle of the direct axis of the rotor with respect to the positive x-direction, and $T_{C1}$ and $T_{C2}$ are constant coefficients. The fact that each of the second component currents $i_{2Cu}$, $i_{2Cv}$, and $i_{2Cw}$ flows only in a part of the respective phase-winding is taken into account with the aid of the coefficients and $T_{C1}$ and $T_{C2}$.

The second component currents $i_{2Cu}$, $i_{2Cv}$, and $i_{2Cw}$ represent the unbalances between the currents carried by the first and second portions of the phase-windings. These unbalances cause a magnetic force directed to the rotor 105. The relation between the second component currents, i.e. the above-mentioned unbalances, and the mutually perpendicular force references can be approximated with the following equations:

$$F_{xref}=F_{C1}(\Psi_{PM}\cos(\theta)i_{2Cu}-\Psi_{PM}\cos(\theta-2\pi/3)i_{2Cv}/2- \\ \Psi_{PM}\cos(\theta-4\pi/3)i_{2Cw}/2), \qquad (2)$$

$$F_{yref}=F_{C1}\sqrt{3}(\Psi_{PM}\cos(\theta-2\pi/3)i_{2Cv}-\Psi_{PM}\cos(\theta-4\pi/3) \\ i_{2Cw})/2, \qquad (3)$$

where $F_{xref}$ is the x-directional force reference, $F_{yref}$ is the y-directional force reference, and $F_{C1}$ is a constant coefficient.

Furthermore, there are the following equations for the first component currents $i_{1Cu}$, $i_{1Cv}$, and $i_{1Cw}$ and for the second component currents $i_{2Cu}$, $i_{2Cv}$, and $i_{2Cw}$:

$$i_{1Cu} + i_{1Cv} + i_{1Cw} = 0, \text{ and} \quad (4)$$

$$i_{2Cu} + i_{2Cv} + i_{2Cw} = 0 \quad (5)$$

The second component currents $i_{2Cu}$, $i_{2Cv}$, and $i_{2Cw}$ can be solved from the above-presented three equations (2), (3), and (5). Thereafter, the solved second component currents $i_{2Cu}$, $i_{2Cv}$, and $i_{2Cw}$ can substituted into equation (1). Equations (1) and (5) are not sufficient for uniquely solving the first component currents $i_{1Cu}$, $i_{1Cv}$, and $i_{1Cw}$ because the power factor, $\cos \varphi$, of the torque generation is not yet defined. The power factor can be defined to be a desired value, e.g. 1, in which case the angle between the space vector of the first component currents $i_{1Cu}$, $i_{1Cv}$, and $i_{1Cw}$ and the direct axis of the rotor is defined. This means that the ratio between the x-component of the space vector, i.e. $i_{1Cu} - (i_{1Cv} + i_{1Cw})/2$, and the y-component of the space vector, i.e. $\sqrt{3}(i_{1Cv} - i_{1Cw})/2$, is defined. This provides a third equation which is needed in addition to equations (1) and (5) for uniquely solving the first component currents $i_{1Cu}$, $i_{1Cv}$, and $i_{1Cw}$.

In an electrical drive according to an exemplifying and non-limiting embodiment of the invention, the computing system 102 is configured to determine third component currents $i_{3Cu}$, $i_{3Cv}$, and $i_{3Cw}$ so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents. In this exemplifying case, the computing system 102 can be configured to determine the reference currents $i_{ref1u}$, $i_{ref1v}$, and $i_{ref1w}$ for the first converter stage 106 on the basis of the first and second component currents so that $i_{ref1u} = i_{1Cu} - i_{2Cu}$, $i_{ref1v} = i_{1Cv} - i_{2Cv}$, and $i_{ref1w} = i_{1Cw} - i_{2Cw}$, and to determine the reference currents $i_{ref2u}$, $i_{ref2v}$, and $i_{ref2w}$ for the second converter stage 113 on the basis of the second and third component currents so that $i_{ref2u} = i_{2Cu} + i_{3Cu}$, $i_{ref2v} = i_{2Cv} + i_{3Cv}$, and $i_{ref2w} = i_{2Cw} + i_{3Cw}$.

In this exemplifying case, an equation that corresponds to the above-presented equation (1) is:

$$T_{ref} = T_{C1}(\Psi_{PM} \cos(\theta)(i_{1Cu} - (i_{1Cv} + i_{1Cw})/2) - \Psi_{PM} \sin(\theta) \\ \sqrt{3}(i_{1Cv} - i_{1Cw})/2) - T_{C2}(\Psi_{PM} \cos(\theta)(i_{2Cu} - (i_{2Cv} + i_{2Cw})/2) - \Psi_{PM} \sin(\theta)\sqrt{3}(i_{2Cv} - i_{2Cw})/2) + T_{C3}(\Psi_{PM} \cos(\theta)(i_{3Cu} - (i_{3Cv} + i_{3Cw})/2) - \Psi_{PM} \sin(\theta)\sqrt{3}(i_{3Cv} - i_{3Cw})/2),$$

where $T_{C3}$ is a constant coefficient.

The unbalance between e.g. the current carried by the first portion 110a of the phase-winding 110 and the current carried by the second portion 110b of the phase-winding 110 is $(i_{1Cu} - i_{2Cu}) - (i_{1Cu} + i_{3Cu}) = -(i_{2Cu} + i_{3Cu})$. Therefore, in this exemplifying case, equations that correspond to the above-presented equations (2) and (3) are:

$$F_{xref} = F_{C2}[\Psi_{PM} \cos(\theta)(i_{2Cu} + i_{3Cu}) - \Psi_{PM} \cos(\theta - 2\pi/3) \\ (i_{2Cv} + i_{CRv})/2 - \Psi_{PM} \cos(\theta - 4\pi/3)(i_{2Cw} + i_{3Cw})/2],$$

$$F_{yref} = F_{C2}\sqrt{3}[\Psi_{PM} \cos(\theta - 2\pi/3)(i_{2Cv} + i_{3Cv}) - \Psi_{PM} \cos(\theta - 4\pi/3)(i_{2Cw} + i_{3Cw})]/2,$$

where $F_{C2}$ is a constant coefficient. As can be seen from the above-presented equations, the third component currents $i_{3Cu}$, $i_{3Cv}$, and $i_{3Cw}$ provide more freedom to determine how the torque generation is shared between the first and second converter stages 106 and 113.

In the above-presented exemplifying cases, it is assumed that the flux-linkages of the phase-windings 110-112 are substantially independent of the currents of the phase-windings 110-112, i.e. the inductances of the phase-windings 110-112 are small. In conjunction with a permanent magnet machine of the kind illustrated in FIG. 1a, this assumption is relatively valid because the effective air-gap is long for the magneto motive forces "mmf" represented by the currents of the phase-windings. In cases where this assumption is not valid with a sufficient accuracy, the computing system 102 can be configured to use a linearized computational model of the electrical machine. The computational model is linearized at each operating point and, for a prevailing operating point, the computing system 102 is configured to determine changes $\Delta i_{1Cu}$, $\Delta i_{1Cv}$ and $\Delta i_{1Cw}$ to be made to the first component currents, changes $\Delta i_{2Cu}$, $\Delta i_{2Cv}$, and $\Delta i_{2Cw}$ to be made to the second component currents, and possibly changes $\Delta i_{3Cu}$, $\Delta i_{3Cv}$, and $\Delta i_{3Cw}$ to be made to the third components currents on the basis of a desired change of the torque $\Delta T_{ref}$ and desired changes of the x- and y-directional magnetic forces $\Delta F_{xref}$ and $\Delta F_{yref}$. In the linearized computational model, products of the above-mentioned changes of the currents are assumed to be so small that these products can be approximated with zeroes.

The control device 101 shown in FIGS. 1a and 1b can be implemented with one or more analogue circuits and/or with one or more digital processor circuits, each of which can be a programmable processor circuit provided with appropriate software, a dedicated hardware processor such as for example an application specific integrated circuit "ASIC", or a configurable hardware processor such as for example a field programmable gate array "FPGA".

Figure 2:
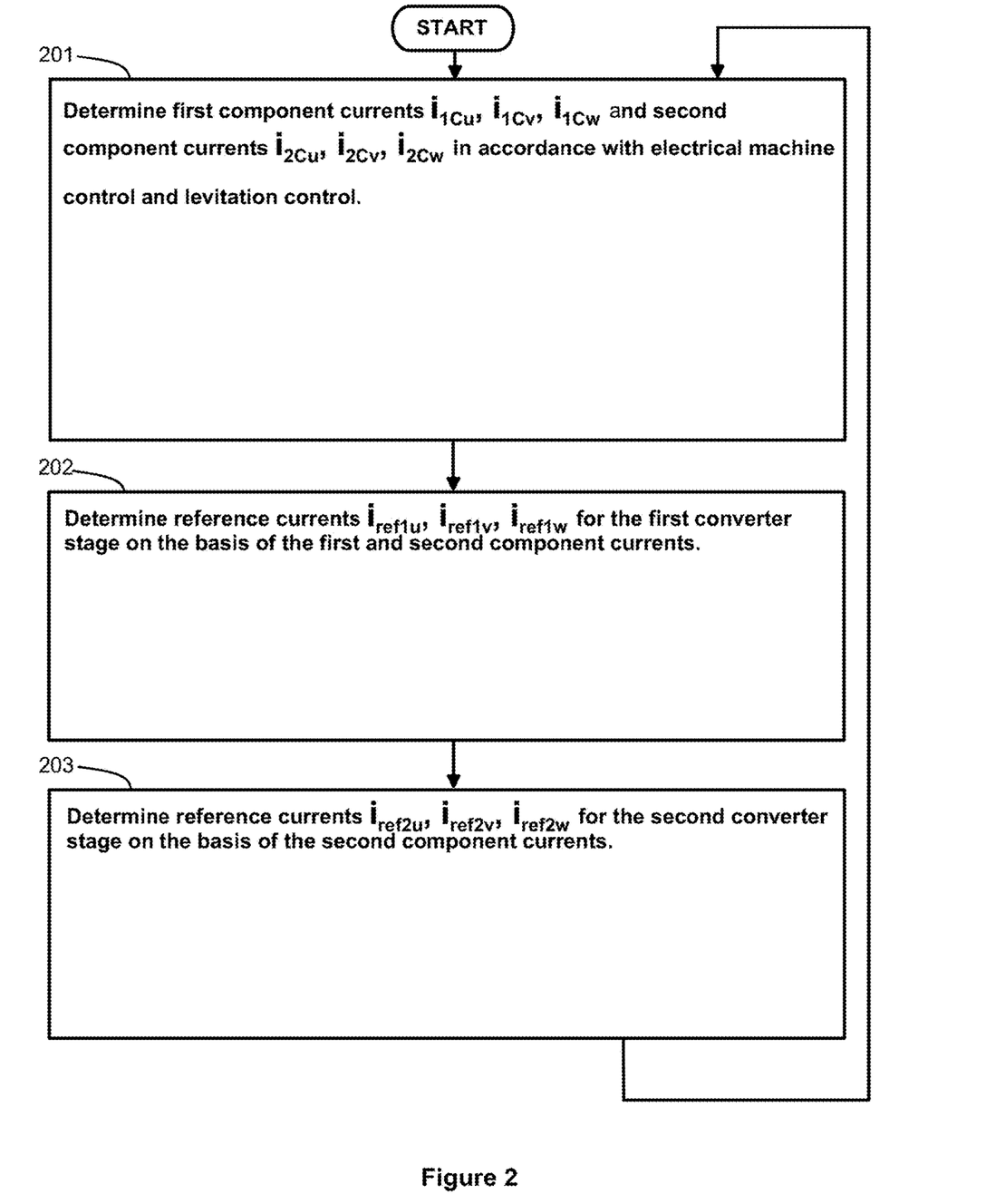
FIG. 2 shows a flowchart of a method according to an exemplifying and nonlimiting embodiment of the invention for controlling an electrical drive.

FIG. 2 shows a flowchart of a method according to an exemplifying and non-limiting embodiment of the invention for controlling an electrical drive that comprises:
- an electrical machine comprising a stator and a rotor,
- a first converter stage connected to terminals of phase-windings of the stator, and
- a second converter stage connected to intermediate points of the phase-windings of the stator, each of the phase-windings comprising a first portion between the terminal and the intermediate point of the phase-winding under consideration, and each of the phase-windings comprising a second portion in addition to the first portion of the phase-winding under consideration.

The method comprises the following actions:
- action 201: determining first component currents $i_{1Cu}$, $i_{1Cv}$, and $i_{1Cw}$ and second component currents $i_{2Cu}$, $i_{2Cv}$, and $i_{2Cw}$ so that torque is generated in accordance with electrical machine control and magnetic levitation force is directed to the rotor in accordance with levitation control when the first portions of the phase-windings carry both the first and second component currents and the second portions of the phase-windings carry at least the first component currents,
- action 202: determining reference currents $i_{ref1u}$, $i_{ref1v}$, and $i_{ref1w}$ for the first converter stage on the basis of the first and second component currents, and
- action 203: determining reference currents $i_{ref2u}$, $i_{ref2v}$, and $i_{ref2w}$ for the second converter stage on the basis of at least the second component currents.

A method according to an exemplifying and non-limiting embodiment of the invention comprises determining the first and second component currents on the basis of a computational model of the electrical machine, the computational model being modelling the electrical machine so that the flux-linkages of the phase-windings are dependent on a rotational position of a permanent magnet rotor and inductances are assumed to be so small that the flux-linkages of the phase-windings are assumed to be substantially independent of the first and second component currents.

A method according to an exemplifying and non-limiting embodiment of the invention comprises determining changes to be made to the first component currents and changes to be made to the second component currents on the basis of a linearized computational model of the electrical machine so that, at each linearization point, products of the changes are approximated with zeroes.

A method according to an exemplifying and non-limiting embodiment of the invention comprises determining third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents. In this exemplifying case, the reference currents for the second converter stage are determined on the basis of the second and third component currents.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software means for controlling a programmable processing system of an electrical drive that comprises:
  an electrical machine comprising a stator and a rotor,
  a first converter stage connected to terminals of phase-windings of the stator, and
  a second converter stage connected to intermediate points of the phase-windings of the stator, each of the phase-windings comprising a first portion between the terminal and the intermediate point of the phase-winding under consideration, and each of the phase-windings comprising a second portion in addition to the first portion of the phase-winding under consideration.

The software means comprise computer executable instructions for controlling the programmable processing system to:
  determine first component currents $i_{1Cu}$, $i_{1Cv}$, and $i_{1Cw}$ and second component currents $i_{2Cu}$, $i_{2Cv}$, and $i_{2Cw}$ so that torque is generated in accordance with electrical machine control and magnetic levitation force is directed to the rotor in accordance with levitation control when the first portions of the phase-windings carry both the first and second component currents and the second portions of the phase-windings carry at least the first component currents,
  determine reference currents $i_{ref1u}$, $i_{ref1v}$, and $i_{ref1w}$ for the first converter stage on the basis of the first and second component currents, and
  determine reference currents $i_{ref2u}$, $i_{ref2v}$, and $i_{ref2w}$ for the second converter stage on the basis of at least the second component currents.

The software means can be e.g. subroutines or functions implemented with a suitable programming language and with a compiler suitable for the programming language and for the programmable processing system under consideration. It is worth noting that also a source code corresponding to a suitable programming language represents the software means because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. an optical disc, encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A control device for controlling an electrical drive, comprising:
  an electrical machine comprising a stator and a rotor;
  a first converter stage connected to terminals of phase-windings of the stator; and
  a second converter stage connected to intermediate points of the phase-windings of the stator,
  each of the phase-windings comprising a first portion between the terminal and the intermediate point of the phase-winding under consideration, and each of the phase-windings comprising a second portion in addition to the first portion of the phase-winding under consideration; and
  a computing system configured to:
    determine first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents,
    determine first reference currents for the first converter stage on the basis of the determined first and second component currents, the first reference currents depending on a reference torque and on a reference magnetic levitation force, and
    determine second reference currents for the second converter stage on the basis of at least the determined second component currents, the second reference currents depending on the reference magnetic levitation force.

2. The control device according to claim 1, wherein the computing system determines the first and second component currents on the basis of a computational model of the electrical machine, the computational model modelling the electrical machine such that flux-linkages of the phase-windings are dependent on a rotational position of a permanent magnet rotor and inductances are assumed to be so small that the flux-linkages of the phase-windings are assumed to be substantially independent of the first and second component currents.

3. The control device according to claim 1, wherein the computing system is further configured to determine changes to be made to the first component currents and changes to be made to the second component currents on the basis of a linearized computational model of the electrical machine so that, at each linearization point, products of the changes are approximated with zeros.

4. The control device according to claim 1, wherein the computing system is further configured to determine third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and to determine the second reference currents of the second converter stage on the basis of the second and third component currents.

5. An electrical drive, comprising:
an electrical machine comprising a stator and a rotor;
a first converter stage connected to terminals of phase-windings of the stator;
a second converter stage connected to intermediate points of the phase-windings of the stator,
each of the phase-windings comprising a first portion between the terminal and the intermediate point of the phase-winding under consideration, and each of the phase-windings comprising a second portion in addition to the first portion of the phase-winding under consideration; and
a control device configured for determining first reference currents for the first converter stage and for determining second reference currents for the second converter stage,
wherein the control device comprises a computing system configured to:
determine first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents,
determine the first reference currents for the first converter stage on the basis of the determined first and second component currents, the first reference currents depending on a reference torque and on a reference magnetic levitation force, and
determine the second reference currents for the second converter stage on the basis of at least the determined second component currents, the second reference currents depending on the reference magnetic levitation force.

6. The electrical drive according to claim 5, wherein the electrical machine is a permanent magnet electrical machine, and the rotor of the electrical machine comprises permanent magnet material.

7. The electrical drive according to claim 5, further comprising at least one of the following so as to provide input data to the electrical machine control and to the levitation control: means for measuring currents, means for measuring magnetic fluxes, means for measuring temperatures, means for measuring a rotational position of a rotor, means for measuring a position of the rotor in directions perpendicular to a rotational axis of the rotor.

8. The electrical drive according to claim 5, wherein the computing system of the control device is further configured to estimate at least one of the following on the basis of measured quantities so as to provide input data to the electrical machine control and to the levitation control: the currents, the magnetic fluxes, the rotational position of the rotor, the position of the rotor in the directions perpendicular to the rotational axis of the rotor.

9. A method for controlling an electrical drive equipped with an electrical machine comprising a stator and a rotor, a first converter stage connected to terminals of phase-windings of the stator, and a second converter stage connected to intermediate points of the phase-windings of the stator, each of the phase-windings comprising a first portion between the terminal and the intermediate point of the phase-winding under consideration, and each of the phase-windings comprising a second portion in addition to the first portion of the phase-winding under consideration,
the method comprising:
determining first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents;
determining first reference currents for the first converter stage on the basis of the determined first and second component currents, the first reference currents depending on a reference torque and on a reference magnetic levitation force; and
determining second reference currents for the second converter stage on the basis of at least the determined second component currents, the second reference currents depending on the reference magnetic levitation force.

10. The method according to claim 9, wherein the determining the first and second component currents comprises execution of a computational model of the electrical machine, the computational model modelling the electrical machine such that flux-linkages of the phase-windings are dependent on a rotational position of a permanent magnet rotor and inductances are assumed to be so small that the flux-linkages of the phase-windings are assumed to be substantially independent of the first and second component currents.

11. The method according to claim 9, further comprising:
determining changes to be made to the first component currents and changes to be made to the second component currents on the basis of a linearized computational model of the electrical machine so that, at each linearization point, products of the changes are approximated with zeros.

12. The method according to claim 9, further comprising:
determining third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and determining the second reference currents of the second converter stage on the basis of the second and third component currents.

13. A non-transitory computer readable medium encoded with a computer program for controlling an electrical drive equipped with an electrical machine comprising a stator and a rotor, a first converter stage connected to terminals of phase-windings of the stator, and a second converter stage connected to intermediate points of the phase-windings of the stator, each of the phase-windings comprising a first portion between the terminal and the intermediate point of the phase-winding under consideration, and each of the phase-windings comprising a second portion in addition to the first portion of the phase-winding under consideration, the computer program comprising computer executable instructions that, upon execution by a programmable processing system of the electrical drive, causes the programmable processing system of the electrical drive to:

determine first component currents and second component currents so that torque is generated in accordance with electrical machine control and magnetic levitation force is directed to the rotor in accordance with levitation control when the first portions of the phase-windings carry both the first and second component currents and the second portions of the phase-windings carry at least the first component currents;

determine first reference currents for the first converter stage on the basis of the determined first and second component currents, the first reference currents depending on a reference torque and on a reference magnetic levitation force; and determine second reference currents for the second converter stage on the basis of at least the determined second component currents, the second reference currents depending on the reference magnetic levitation force.

14. The control device according to claim 2, wherein the computing system is further configured to determine third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and to determine the second reference currents of the second converter stage on the basis of the second and third component currents.

15. The control device according to claim 3, wherein the computing system is further configured to determine third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and to determine the second reference currents of the second converter stage on the basis of the second and third component currents.

16. The electrical drive according to claim 6, further comprising at least one of the following so as to provide input data to the electrical machine control and to the levitation control: means for measuring currents, means for measuring magnetic fluxes, means for measuring temperatures, means for measuring a rotational position of a rotor, means for measuring a position of the rotor in directions perpendicular to a rotational axis of the rotor.

17. The method according to claim 10, further comprising:

determining third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and determining the second reference currents of the second converter stage on the basis of the second and third component currents.

18. The method according to claim 11, further comprising:

determining third component currents so that the torque is generated in accordance with the electrical machine control and the magnetic levitation force is directed to the rotor in accordance with the levitation control when the first portions of the phase-windings carry both the first and second component currents and the second portions of the phase-windings carry both the first and third component currents, and determining the second reference currents of the second converter stage on the basis of the second and third component currents.

* * * * *